United States Patent
Wu

(10) Patent No.: US 10,517,039 B1
(45) Date of Patent: Dec. 24, 2019

(54) METHOD AND APPARATUS FOR MOBILE COUNTRY CODE RECOGNITION IN MOBILE COMMUNICATIONS

(71) Applicant: MediaTek Inc., Hsinchu (TW)

(72) Inventor: Pei-Tsung Wu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 1 day.

(21) Appl. No.: 16/013,911

(22) Filed: Jun. 20, 2018

(51) Int. Cl.
  *H04W 48/20* (2009.01)
  *H04W 48/16* (2009.01)
  *H04B 17/318* (2015.01)

(52) U.S. Cl.
  CPC .......... *H04W 48/20* (2013.01); *H04B 17/318* (2015.01); *H04W 48/16* (2013.01)

(58) Field of Classification Search
  CPC ..... H04W 48/20; H04W 48/16; H04B 17/318
  See application file for complete search history.

(56) References Cited

U.S. PATENT DOCUMENTS

| 9,125,146 B1* | 9/2015 | Edara ................... H04W 48/16 |
| 2015/0119029 A1* | 4/2015 | Scribano ............... H04W 48/18 |
| | | 455/434 |
| 2017/0013548 A1* | 1/2017 | Manne .................. H04W 48/16 |

* cited by examiner

*Primary Examiner* — Curtis A Alia
(74) *Attorney, Agent, or Firm* — Han IP PLLC; Andy M. Han

(57) ABSTRACT

Various solutions for mobile country code recognition with respect to user equipment in mobile communications are described. An apparatus may measure a received signal strength. The apparatus may determine a mobile country code (MCC) according to the received signal strength. The apparatus may determine a frequency band search order according to the determined MCC. The apparatus may search a suitable cell according to the frequency band search order. The apparatus may camp the suitable cell.

20 Claims, 6 Drawing Sheets

| COUNTRY/AREA | LTE BAND | UMTS BAND | GSM BAND |
|---|---|---|---|
| CHINA | 1, 3, 5, 34, 39, 40, 41 | 1, 8, 34, 39 | 3, 8 |
| TAIWAN | 3, 7, 8, 28, 38, 41 | 1 | 3, 8 |
| HONG KONG | 3, 7, 8, 40 | 1, 5, 8 | 3, 8 |
| MACAU | 3, 7, 40 | 1 | 3, 8 |
| US | 2, 4, 5, 12, 13, 17, 25, 26, 29, 30, 41, 66, 71 | 2, 4, 5 | 2, 5 |

METHOD AND APPARATUS FOR MOBILE COUNTRY CODE RECOGNITION IN MOBILE COMMUNICATIONS

TECHNICAL FIELD

The present disclosure is generally related to mobile communications and, more particularly, to mobile country code recognition with respect to user equipment in mobile communications.

BACKGROUND

Unless otherwise indicated herein, approaches described in this section are not prior art to the claims listed below and are not admitted as prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals. In addition, there are some newly developed next generation communication technologies such as $5^{th}$ Generation (5G), New Radio (NR), Internet of Things (IoT) and Narrow Band Internet of Things (NB-IoT). These communication technologies are developed for higher speed transmission and serving for huge number of devices including machine type devices.

In some scenarios, when the UE is powered on or tries to recover from an out of service state, the UE may need to find a suitable cell of a public land mobile network (PLMN) to camp on. The UE may have to perform a frequency scan procedure to find the suitable cell. However, if the UE is not aware of the location (e.g., country or area) of the UE, the UE may not know which frequency bands should be searched first. The UE may only have to perform full-band search for all frequency bands supported by the UE. The full-band search procedure usually take significant long time and may consume significant power of the UE. This may degrade the user experiences. In a worse case, some frequency bands may not be supported or deployed in some countries. The UE may even spend unnecessary time and power to scan those un-supported frequency bands. If the UE can get the location information or the mobile country code, the UE may be able to determine the supported frequency bands in that country or area and may only scan the supported frequency bands.

Accordingly, it is important for the UE to get the location information or the mobile country code to camp on a cell quickly and save power consumption. Therefore, it is needed to provide a mechanism for recognizing the mobile country code.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to mobile country code recognition with respect to user equipment in mobile communications.

In one aspect, a method may involve an apparatus measuring a received signal strength. The method may also involve the apparatus determining a mobile country code (MCC) according to the received signal strength. The method may further involve the apparatus determining a frequency band search order according to the determined MCC. The method may further involve the apparatus searching a suitable cell according to the frequency band search order. The method may further involve the apparatus camping on the suitable cell.

In one aspect, an apparatus may comprise a transceiver capable of wirelessly communicating with a plurality of nodes of a wireless network. The apparatus may also comprise a processor communicatively coupled to the transceiver. The processor may be capable of measuring a received signal strength. The processor may also be capable of determining a mobile country code (MCC) according to the received signal strength. The processor may further be capable of determining a frequency band search order according to the determined MCC. The processor may further be capable of searching, via the transceiver, a suitable cell according to the frequency band search order. The processor may further be capable of camping on the suitable cell.

It is noteworthy that, although description provided herein may be in the context of certain radio access technologies, networks and network topologies such as Global System for Mobile communications (GSM), Wideband Code Division Multiple Access (WCDMA), Universal Mobile Telecommunications System (UMTS), Long-Term Evolution (LTE), LTE-Advanced, LTE-Advanced Pro, 5th Generation (5G) and New Radio (NR), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a diagram depicting an example table of supported frequency bands in different countries.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to mobile country code recognition with respect to user equipment in mobile communications. According to the present disclosure, a number of possible solutions may be implemented separately or jointly. That is, although these possible solutions may be described below separately, two or more of these possible solutions may be implemented in one combination or another.

Figure 1:
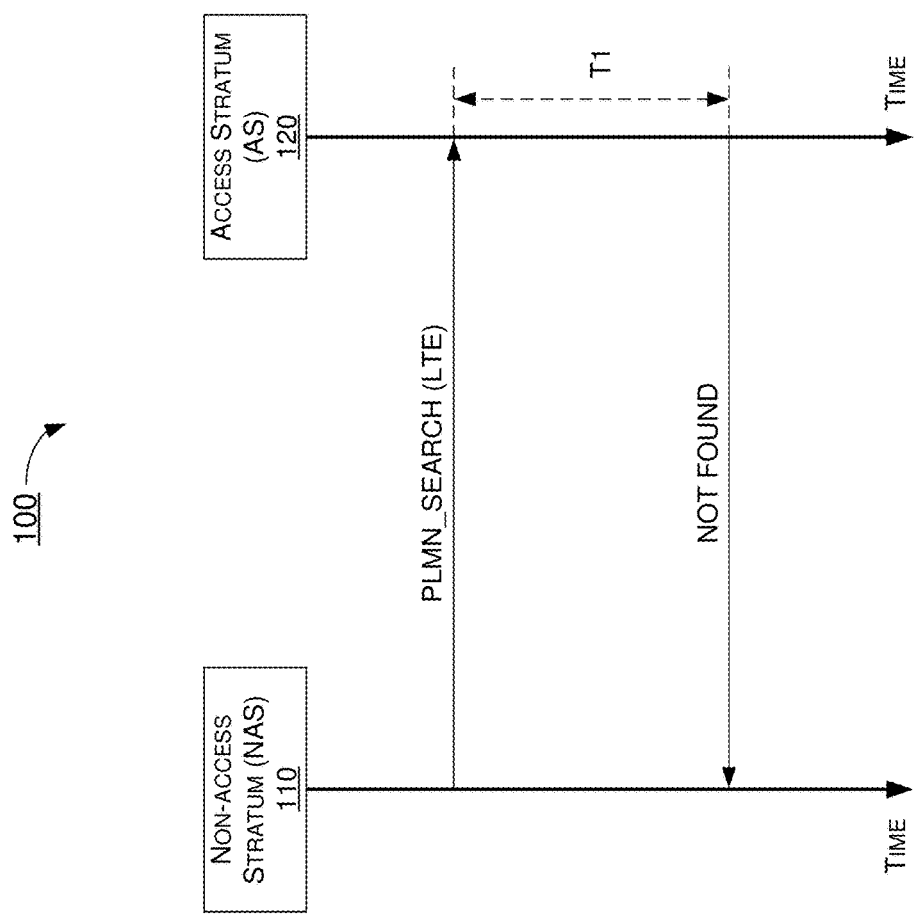
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a user equipment and a plurality of network nodes, which may be a part of a wireless communication network (e.g., a GSM network, a UMTS network, an LTE network, an LTE-Advanced network, an LTE-Advanced Pro network, a 5G network or an NR network). The UE may comprise a non-access stratum (NAS) layer 110 and an access stratum (AS) layer 120. When the UE is powered on or tries to recover from an out of service state, the UE may need to find a suitable cell of a public land mobile network (PLMN) to camp on. The UE may configure NAS layer 110 to instruct AS layer 120 to perform a PLMN search procedure. AS layer 120 may be configured to scan frequency bands to find a suitable cell.

FIG. 2 illustrates an example table 200 of supported frequency bands in different countries. A radio access technology (RAT) may be deployed with different frequency bands in different countries. For example, LTE may be deployed in bands 1, 3, 5, 34, 39, 40 and 41 in China, but may be deployed in bands 3, 7, 8, 28, 38 and 41 in Taiwan. When the UE needs to perform PLMN search, in a case that the UE is not aware of the location (e.g., country) of the UE, the UE may not know which bands should be searched. Therefore, the UE may be configured to perform full-band search.

Normally, the UE may be configured to search LTE bands first to find whether there exist an LTE cell for camping on. However, in some countries (e.g., African countries), there may be no LTE network. In a case that the UE is powered on in an African country, the UE may be configured to search all LTE bands sequentially. As showed in FIG. 1, NAS layer 110 may configure AS layer 120 to search LTE bands first. After a period T1, AS layer 120 may respond to NAS layer 110 that no available cell can be found. In such scenario, the period T1 may be wasted since there is no LTE network in that area. In addition, the UE power may also be wasted due to unnecessary PLMN search procedures. In a case that the UE supports many LTE bands, the UE may have to spend more time and more power to search all the supported bands.

Figure 3A:
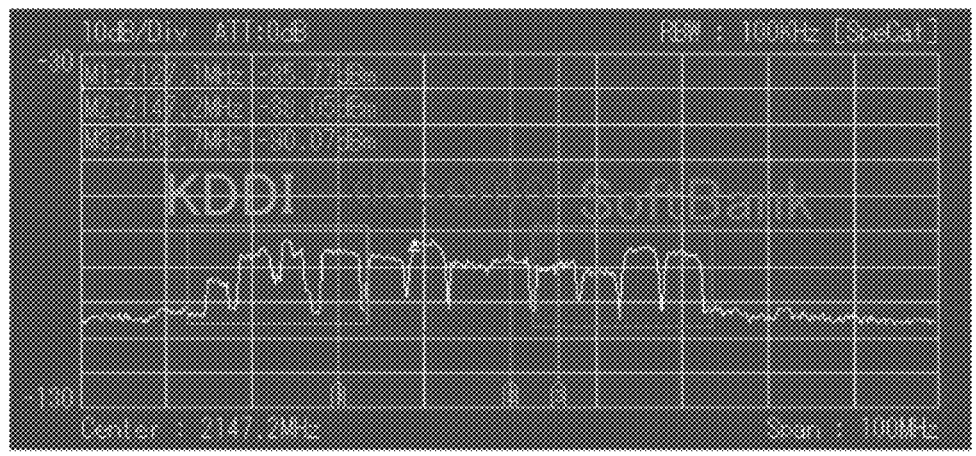
FIGS. 3A-3B illustrate example frequency spectrums deployed in different countries.
Figure 3B:
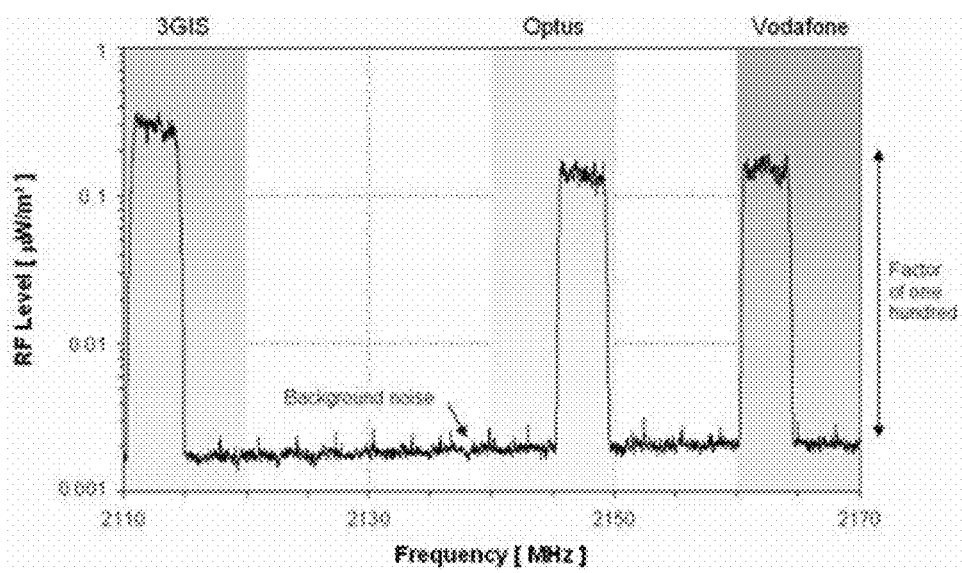

FIGS. 3A-3B illustrate example frequency spectrums deployed in different countries. FIG. 3A illustrates the frequency spectrum in 2100 MHz frequency band deployed by Japanese operators (e.g., KDDI, DOCOMO and SoftBank). The horizontal axis represents frequency sub-bands. The vertical axis represents signal strength. As showed in FIG. 3A, the signal strength patterns of each operator are different. Each operator may deploy its frequency spectrum in specific sub-bands with specific signal strength waveform. FIG. 3B illustrates the frequency spectrum in 2100 MHz frequency band deployed by Australian operators (e.g., 3GIS, Optus and Vodafone). Similarly, the horizontal axis represents frequency sub-bands. The vertical axis represents signal strength. As showed in FIG. 3B, the signal strength patterns of each operator are different. In addition, the signal strength patterns of Australian operators are also different from the signal strength patterns of Japanese operators. The operators in different countries may be allocated with different frequency sub-bands and may use different power strengths to transmit signals.

In view of variant signal strength patterns distributed in different countries, the UE may be able to recognize the mobile country code (MCC) according to the measured signal strength pattern. Specifically, when the UE is powered on or tries to recover from an out of service state, the UE may be configured to find a suitable cell to camp on. At first, the UE may be configured to search the frequencies of a list of stored cells which the UE ever camped on previously. In an event that a suitable cell is found from the stored frequencies, the UE may be able to quickly camp on the suitable cell. In an event that no suitable cell can be found from the stored frequencies, the UE may be configured to measure a received signal strength. The received signal strength may comprise, for example and without limitation, a received signal strength indication (RSSI). The UE may be configured to measure a plurality of RSSIs in at least one sub-band. The sub-band may be continuous sub-bands or un-continuous sub-bands. For example, the UE may be configured to divide the UE supported bands into a plurality of sub-bands. The UE may measure the RSSIs in every 5 MHz frequency span.

The UE may be configured to determine an MCC or multiple MCCs according to the received signal strength. Specifically, the UE may be configured to generate a RSSI pattern according to the measured RSSIs. The RSSI pattern may comprise a plurality of measured RSSIs corresponding to a plurality of frequencies. The UE may be configured to compare the measured RSSI pattern with a plurality of pre-stored RSSI waveforms corresponding to a plurality of MCCs. As aforementioned, the operators in different countries may have their own unique signal strength patterns. These unique signal strength patterns may be recorded as RSSI wave forms and may be pre-stored in the memory of the UE. Each RSSI wave form may correspond to an operator in a country and may correspond to an MMC. Accordingly, the UE may be configured to compare the measured RSSI pattern with the pre-stored RSSI wave forms to generate a comparison result. The UE may be able to determine at least one MCC according to the comparison result. The UE may be configured to choose at least one RSSI waveform which is closest to the measured RSSI pattern and determine the MCC corresponding the chose RSSI waveform.

Figure 4:
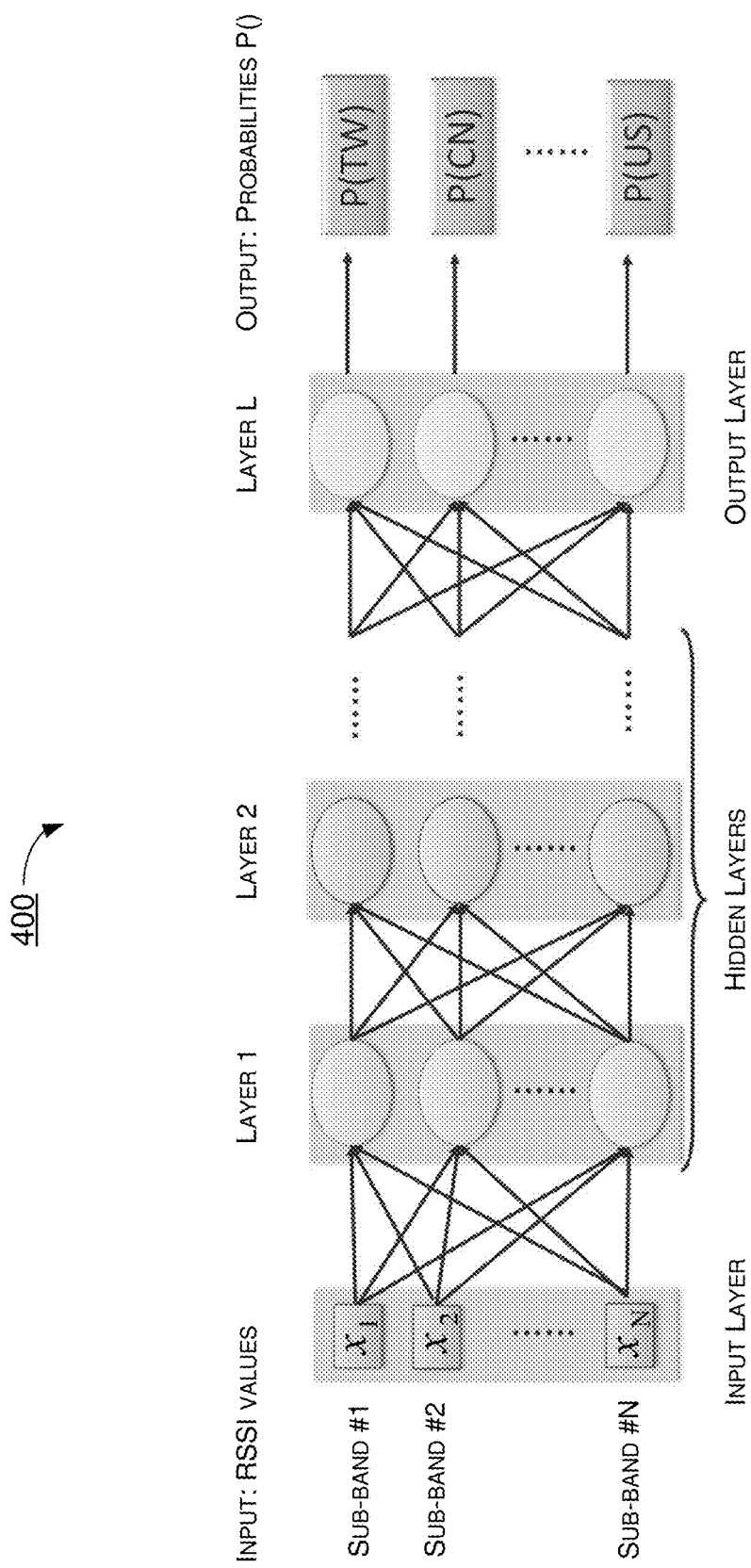
FIG. 4 illustrates an example MCC classifier under schemes in accordance with implementations of the present disclosure.

In some implementations, after generating a RSSI pattern according to the measured RSSIs, the UE may be configured to input the RSSI pattern to an MCC classifier. The MCC classifier may be configured to compare the measured RSSI pattern with a plurality of pre-stored RSSI waveforms corresponding to a plurality of MCCs. The MCC classifier may perform the comparison or calculations to generate a plurality of output probabilities according to, for example and without limitation, a deep learning mechanism, a machine learning mechanism, a neural network mechanism or an artificial intelligence mechanism. The MCC classifier may be implemented as a software, a hardware or a combination of both software and hardware. FIG. 4 illustrates an example MCC classifier 400 under schemes in accordance with implementations of the present disclosure. As showed in FIG. 4, MCC classifier 400 may comprise an input layer, an output layer and a plurality of hidden layers or middle layers. The input layer may receive a plurality of input data (e.g., a plurality of measured RSSI values in at least one sub-band). The hidden layers or middle layers may perform calculations to estimate the correlations or similarities between the input data and the pre-stored RSSI waveforms. The output layer may output a plurality of probabilities corresponding to a plurality of MCCs. The probability may represent the similarity between the input measured RSSI pattern and the RSSI waveform of a corresponding country. Accordingly, the UE may be able to determine an MCC according to the plurality of output probabilities. For example, the UE may choose an MCC with the highest probability value.

The UE may be further configured to determine whether at least one of the probabilities outputted from the MCC classifier is greater than a threshold value. In an event that no probability is greater than the threshold value or no MCC can be found, the UE may be configured to perform initial cell selection procedures and may need to perform full-band scan to find a suitable cell. In an event that at least one MCC is determined, the UE may be configured to search a suitable cell according to the determined MCC.

In some implementations, the MCC classifier may generate multiple probabilities which are all greater than the threshold value. In such scenario, a plurality of MCCs may be qualified for performing frequency band search. The UE may be further configured to sort the plurality of MCCs and search the frequency bands supported by each of the qualified MCC. Alternatively, the UE may also choose one of the qualified MCCs randomly or according to some pre-determined rules for performing frequency band search.

After determining at least one MCC, the UE may be configured to determine a RAT and/or frequency band search order according to the determined MCC. Specifically, when an MCC is determined, the UE may be able to determine a possible country or area where the UE may be. The UE may be configured to select a plurality of RATs (e.g., LTE, NR, WCDMA) and/or a plurality of frequency bands supported by the MCC. The supported frequency band may also correspond to a supported RAT. The UE may select a supported RAT and a plurality of supported frequency bands according to a pre-stored band table corresponding to the MCC. As showed in FIG. 2, table 200 may be an example of the pre-stored band table. For example, assuming that the determined MCC corresponds to Taiwan, the UE may be configured to select LTE bands 3, 7, 8, 28, 38 and 41 to search an LTE cell. The UE may skip the search on other bands or other RATs not supported by the determined MCC.

Normally, the UE may be configured to determine a RAT and/or frequency band search order according to the measured RSSI strengths. For example, after measuring a plurality RSSI strengths, the frequency band search order may be determined as bands 8, 20, 38, 3, 4, 7, 1, 41, 12, 27, 17, 26, 5, 2, 38, etc. according to the RSSI strength order. However, in view of the determined MCC (e.g., Taiwan), the UE may only select the supported LTE bands in Taiwan (e.g. bands 3, 7, 8, 28, 38 and 41) to perform cell search procedures. Therefore, the frequency band search order may become bands 8, 28, 3, 7, 41, 38. The other frequency bands not supported in Taiwan (e.g., bands 20, 4, 1, 12, 27, 17, 26, 5, 2, etc.) may be skipped for saving search time and power consumption.

The UE may be configured to search a suitable cell according to the RAT and/or frequency band search order. The UE may be further configured to determine whether a suitable cell can be found according to the RAT and/or frequency band search order. In an event that a suitable cell is found, the UE may be configured to camp on the suitable cell. In an event that no suitable cell can be found, the UE may be configured to perform initial cell selection procedures and may need to perform full-band scan to find a suitable cell.

In some implementation, when performing the full-band scan procedure, the UE may be configured to skip the frequency bands already searched according to the RAT and/or frequency band search order. For example, in an event that bands 3, 7, 8, 28, 38 and 41 corresponding to the determined MCC (e.g., Taiwan) are already searched, the UE may skip these bands when performing the full-band scan procedure to avoid duplicate search.

Accordingly, the total time needed for camping on a suitable cell in accordance with implementations of the present disclosure may be estimated according to the following equation.

$$\text{Cell camping time} = T(\text{search stored frequency}) + T(\text{sniff sub-band RSSI}) + T(\text{search determined frequency})$$

T(search stored frequency) represents the time needed for searching the stored frequencies which the UE ever camped on previously. T(sniff sub-band RSSI) represents the time needed for the UE to sniff RSSIs in at least one sub-band. T(search determined frequency) represents the time needed for the UE to perform cell search according to the determined RAT and/or frequency band search order. If the determined MCC is matched with the location of the UE, the cell camping time may be much reduced. The UE may not need to perform full-band search to find a suitable cell in an unknown location. Unnecessary power consumption may be avoided, and the user experience may also be improved.

Illustrative Implementations

Figure 5:
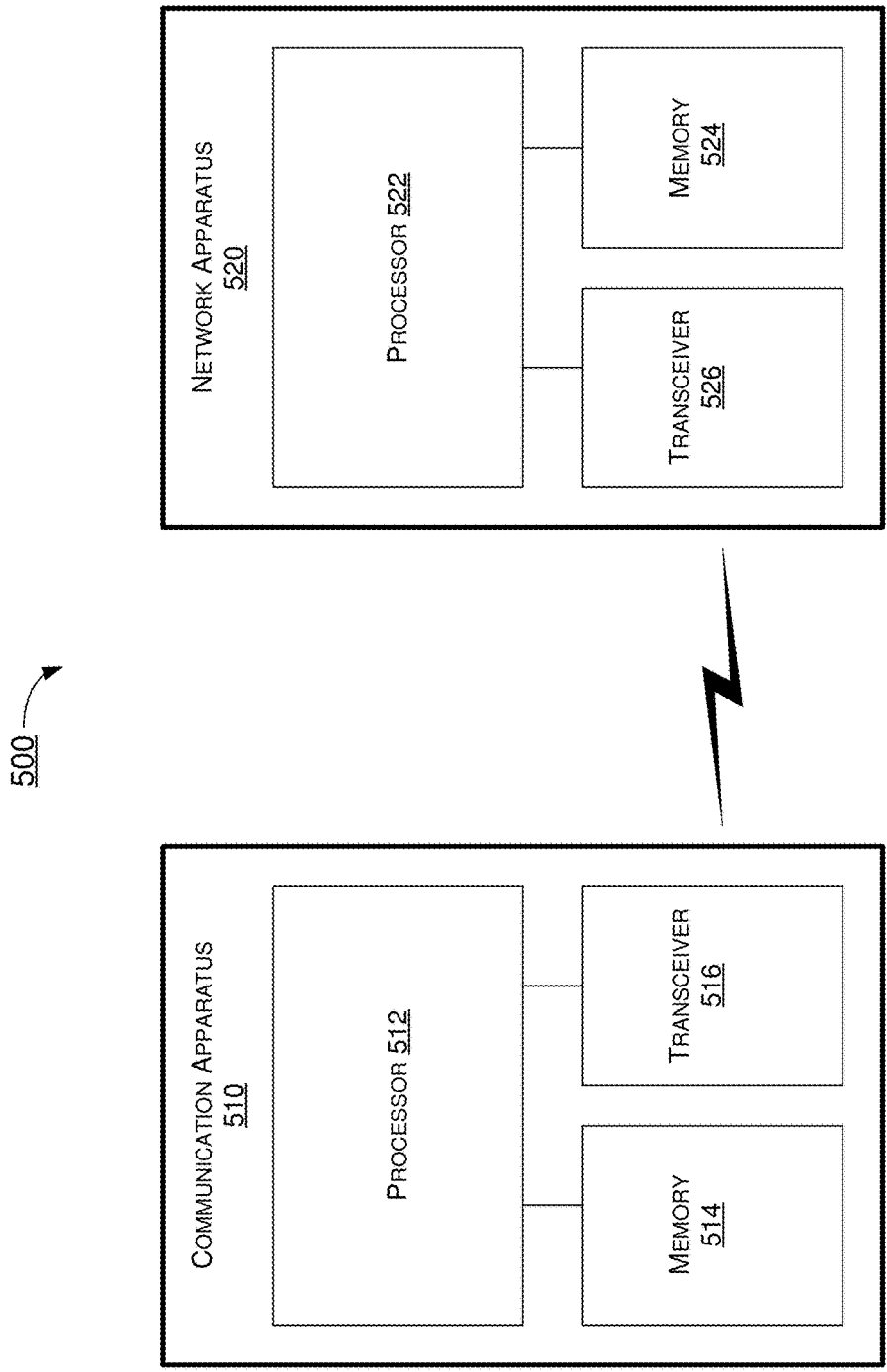
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to mobile country code recognition with respect to user equipment and network apparatus in wireless communications, including scenarios described above as well as process 600 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT or NB-IoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, or one or more complex-instruction-set-computing (CISC) processors. Communication apparatus 510 may include at least some of those components shown in FIG. 5 such as a processor 512, for example. communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a base station, a small cell, a router or a gateway. For instance, network apparatus 520 may be implemented in a base station in a GSM or UMTS network, in an eNodeB in an LTE, LTE-Advanced or LTE-Advanced Pro network or in a gNB in a 5G, NR, IoT or NB-IoT network. Alternatively, network apparatus 520 may be implemented in the form of one or more IC chips such as, for example and without limitation, one or more single-core processors, one or more multi-core processors, or one or more CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, processor 512 may comprise a NAS layer and an AS layer. When communication apparatus 510 is powered on or tries to recover from an out of service state, processor 512 may need to find a suitable cell (e.g., network apparatus 520) of a PLMN to camp on. Processor 512 may configure the NAS layer to instruct the AS layer to perform a PLMN search procedure. Processor 512 may configure the AS layer to scan, via transceiver 516, frequency bands to find a suitable cell.

In some implementations, processor 512 may be configured to recognize the MCC according to the measured signal strength pattern. Specifically, when communication apparatus 510 is powered on or tries to recover from an out of service state, processor 512 may be configured to find a suitable cell to camp on. At first, processor 512 may be configured to search the frequencies of a list of stored cells which communication apparatus 510 ever camped on previously. In an event that a suitable cell is found from the stored frequencies, processor 512 may be able to quickly camp on the suitable cell. In an event that no suitable cell can be found from the stored frequencies, processor 512 may be configured to measure, via transceiver 516, a received signal strength. The received signal strength may comprise, for example and without limitation, a RSSI. Processor 512 may be configured to measure, via transceiver 516, a plurality of RSSIs in at least one sub-band. The sub-band may be continuous sub-bands or un-continuous sub-bands. For example, processor 512 may be configured to divide the supported bands into a plurality of sub-bands. Processor 512 may measure the RSSIs in every 5 MHz frequency span.

Processor 512 may be configured to determine an MCC or multiple MCCs according to the received signal strength. Specifically, processor 512 may be configured to generate a RSSI pattern according to the measured RSSIs. The RSSI pattern may comprise a plurality of measured RSSIs corresponding to a plurality of frequencies. Processor 512 may be configured to compare the measured RSSI pattern with a plurality of pre-stored RSSI waveforms corresponding to a plurality of MCCs. The operators in different countries may have their own unique signal strength patterns. These unique signal strength patterns may be recorded as RSSI wave forms and may be pre-stored in memory 514 of communication apparatus 510. Each RSSI wave form may correspond to an operator in a country and may correspond to an MMC. Accordingly, processor 512 may be configured to compare the measured RSSI pattern with the pre-stored RSSI wave forms to generate a comparison result. Processor 512 may be able to determine at least one MCC according to the comparison result. Processor 512 may be configured to choose at least one RSSI waveform which is closest to the measured RSSI pattern and determine the MCC corresponding the chose RSSI waveform.

In some implementations, communication apparatus 510 or processor 512 may further comprise an MCC classifier. The MCC classifier may be coupled to processor 512 or may be implemented within processor 512. After generating a RSSI pattern according to the measured RSSIs, processor 512 may be configured to input the RSSI pattern to an MCC classifier. The MCC classifier may be configured to compare the measured RSSI pattern with a plurality of pre-stored RSSI waveforms corresponding to a plurality of MCCs. The MCC classifier may perform the comparison or calculations to generate a plurality of output probabilities according to, for example and without limitation, a deep learning mechanism, a machine learning mechanism, a neural network mechanism or an artificial intelligence mechanism. The MCC classifier may be implemented as a software, a hardware or a combination of both software and hardware. The MCC classifier may comprise an input layer, an output layer and a plurality of hidden layers or middle layers. The input layer may receive a plurality of input data (e.g., a plurality of measured RSSI values in at least one sub-band). The hidden layers or middle layers may perform calculations to estimate the correlations or similarities between the input data and the pre-stored RSSI waveforms. The output layer may output a plurality of probabilities corresponding to a plurality of MCCs. Accordingly, processor 512 may be able to determine an MCC according to the plurality of output probabilities. For example, processor 512 may choose an MCC with the highest probability value.

In some implementations, processor 512 may be further configured to determine whether at least one of the probabilities outputted from the MCC classifier is greater than a threshold value. In an event that no probability is greater than the threshold value or no MCC can be found, processor 512 may be configured to perform initial cell selection procedures and may need to perform full-band scan to find a suitable cell. In an event that at least one MCC is determined, processor 512 may be configured to search a suitable cell according to the determined MCC.

In some implementations, the MCC classifier may generate multiple probabilities which are all greater than the threshold value. In such scenario, a plurality of MCCs may be qualified for performing frequency band search. Processor 512 may be further configured to sort the plurality of MCCs and search the frequency bands supported by each of the qualified MCC. Alternatively, processor 512 may also choose one of the qualified MCCs randomly or according to some pre-determined rules for performing frequency band search.

In some implementations, after determining at least one MCC, processor 512 may be configured to determine a RAT and/or frequency band search order according to the determined MCC. Specifically, when an MCC is determined, processor 512 may be able to determine a possible country or area where communication apparatus 510 may be. Processor 512 may be configured to select a plurality of RATs (e.g., LTE, NR, WCDMA) and/or a plurality of frequency bands supported by the MCC. The supported frequency band may also correspond to a supported RAT. Processor 512 may select a supported RAT and a plurality of supported frequency bands according to a pre-stored band table corresponding to the MCC. For example, assuming that the determined MCC corresponds to Taiwan, processor 512 may be configured to select LTE bands 3, 7, 8, 28, 38 and 41 to search an LTE cell. Processor 512 may skip the search on other bands or other RATs not supported by the determined MCC.

In some implementations, processor 512 may be configured to determine a RAT and/or frequency band search order according to the measured RSSI strengths. For example, after measuring a plurality RSSI strengths, the frequency band search order may be determined as bands 8, 20, 38, 3, 4, 7, 1, 41, 12, 27, 17, 26, 5, 2, 38, etc. according to the RSSI strength order. However, in view of the determined MCC (e.g., Taiwan), processor 512 may only select the supported LTE bands in Taiwan (e.g. bands 3, 7, 8, 28, 38 and 41) to perform cell search procedures. Therefore, the frequency band search order may become bands 8, 28, 3, 7, 41, 38. Processor 512 may skip the other frequency bands not supported in Taiwan (e.g., bands 20, 4, 1, 12, 27, 17, 26, 5, 2, etc.) for saving search time and power consumption.

In some implementations, processor 512 may be configured to search a suitable cell according to the RAT and/or frequency band search order. Processor 512 may be further configured to determine whether a suitable cell can be found according to the RAT and/or frequency band search order. In an event that a suitable cell is found, processor 512 may be configured to camp on the suitable cell. In an event that no suitable cell can be found, processor 512 may be configured to perform initial cell selection procedures and may need to perform full-band scan to find a suitable cell.

In some implementation, when performing the full-band scan procedure, processor 512 may be configured to skip the frequency bands already searched according to the RAT and/or frequency band search order. For example, in an event that bands 3, 7, 8, 28, 38 and 41 corresponding to the determined MCC (e.g., Taiwan) are already searched, processor 512 may skip these bands when performing the full-band scan procedure to avoid duplicate search.

Illustrative Processes

Figure 6:
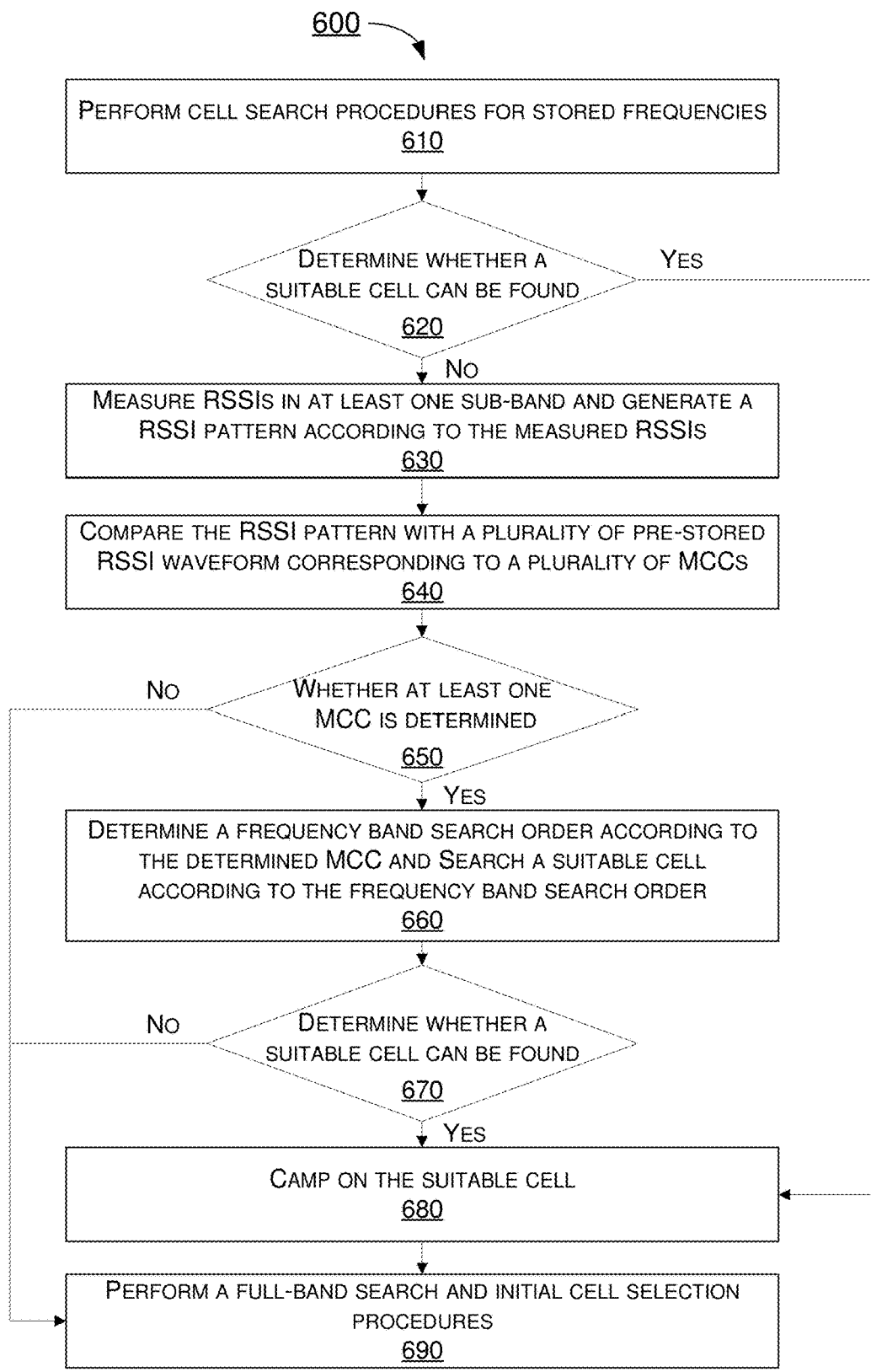
FIG. 6 is a flowchart of an example process in accordance with an implementation of the present disclosure.

FIG. 6 illustrates an example process 600 in accordance with an implementation of the present disclosure. Process 600 may be an example implementation of scenarios described above, whether partially or completely, with respect to mobile country code recognition in accordance with the present disclosure. Process 600 may represent an aspect of implementation of features of communication apparatus 510. Process 600 may include one or more operations, actions, or functions as illustrated by one or more of blocks 610, 620, 630, 640, 650, 660, 670, 680 and 690. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve communication apparatus 510 performing cell search procedures for stored frequencies when communication apparatus 510 is powered on or tries to recover from an out of service state. The stored frequencies may comprise the frequencies of a list of stored cells which communication apparatus 510 ever camped on previously. Process 600 may proceed from 610 to 620.

At 620, process 600 may involve communication apparatus 510 determining whether a suitable cell can be found. In a case of yes, process 600 may proceed from 620 to 680. In a case of no, process 600 may proceed from 620 to 630.

At 630, process 600 may involve communication apparatus 510 measuring a plurality of RSSIs in at least one sub-band and generating a RSSI pattern according to the measured RSSIs. Process 600 may proceed from 630 to 640.

At 640, process 600 may involve communication apparatus 510 comparing the RSSI pattern with a plurality of pre-stored RSSI waveforms corresponding to a plurality of MCCs. Process 600 may proceed from 640 to 650.

At 650, process 600 may involve communication apparatus 510 determining whether at least one MCC is determined. In a case of no, process 600 may proceed from 650 to 690. In a case of yes, process 600 may proceed from 650 to 660.

At 660, process 600 may involve communication apparatus 510 determining a frequency band search order according to the determined MCC and searching a suitable cell according to the frequency band search order. Process 600 may proceed from 660 to 670.

At 670, process 600 may involve communication apparatus 510 determining whether a suitable cell can be found. In a case of no, process 600 may proceed from 670 to 690. In a case of yes, process 600 may proceed from 670 to 680.

At 680, process 600 may involve communication apparatus 510 camping on the suitable cell.

At 690, process 600 may involve communication apparatus 510 performing a full-band search and initial cell selection procedures.

In some implementations, process 600 may involve communication apparatus 510 generating a RSSI pattern according to the measured RSSIs and inputting the RSSI pattern to an MCC classifier. The MCC classifier may generate a plurality of output probabilities corresponding to a plurality of MCCs. Process 600 may involve communication apparatus 510 determining the MCC according to the plurality of output probabilities.

In some implementations, the MCC classifier may generate the plurality of output probabilities according to a deep learning mechanism, a machine learning mechanism, a neural network mechanism or an artificial intelligence mechanism.

In some implementations, process 600 may involve communication apparatus 510 determining the frequency band search order by selecting a plurality of frequency bands supported by the MCC. Alternatively, process 600 may involve communication apparatus 510 determining the frequency band search order by selecting a plurality of frequency bands according to a pre-stored band table corresponding to the MCC.

In some implementations, process 600 may involve communication apparatus 510 skipping search of a frequency band not supported by the determined MCC.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   measuring, by a processor of an apparatus, a received signal strength;
   determining, by the processor, a mobile country code (MCC) according to the received signal strength;
   determining, by the processor, a frequency band search order according to the determined MCC;
   searching, by the processor, a suitable cell according to the frequency band search order; and
   camping on, by the processor, the suitable cell.

2. The method of claim 1, wherein the received signal strength comprises a received signal strength indication (RSSI).

3. The method of claim 2, wherein the measuring comprises measuring a plurality of RSSIs in at least one sub-band.

4. The method of claim 3, wherein the determining of the MCC comprises:
   generating, by the processor, a RSSI pattern according to the measured RSSIs;
   comparing, by the processor, the RSSI pattern with a plurality of pre-stored RSSI waveforms corresponding to a plurality of MCCs; and
   determining, by the processor, the MCC according to a comparison result.

5. The method of claim 3, wherein the determining of the MCC comprises:
   generating, by the processor, a RSSI pattern according to the measured RSSIs;
   inputting, by the processor, the RSSI pattern to an MCC classifier; and
   determining, by the processor, the MCC according to a plurality of output probabilities,
   wherein the MCC classifier generates the plurality of output probabilities corresponding to a plurality of MCCs.

6. The method of claim 5, wherein the MCC classifier generates the plurality of output probabilities according to a deep learning mechanism, a machine learning mechanism, a neural network mechanism or an artificial intelligence mechanism.

7. The method of claim 1, wherein the determining of the frequency band search order comprises selecting a plurality of frequency bands supported by the MCC.

8. The method of claim 1, wherein the determining of the frequency band search order comprises selecting a plurality of frequency bands according to a pre-stored band table corresponding to the MCC.

9. The method of claim 1, further comprising:
   skipping, by the processor, search of a frequency band not supported by the determined MCC.

10. The method of claim 1, further comprising:
    performing, by the processor, a full-band search in an event that no suitable cell is found according to the frequency band search order.

11. An apparatus, comprising:
    a transceiver capable of wirelessly communicating with a plurality of nodes of a wireless network; and
    a processor communicatively coupled to the transceiver, the processor capable of:
      measuring, via the transceiver, a received signal strength;
      determining a mobile country code (MCC) according to the received signal strength;
      determining a frequency band search order according to the determined MCC;
      searching, via the transceiver, a suitable cell according to the frequency band search order; and
      camping on the suitable cell.

12. The apparatus of claim 11, wherein the received signal strength comprises a received signal strength indication (RSSI).

13. The apparatus of claim 12, wherein, in measuring the received signal strength, the processor measures a plurality of RSSIs in at least one sub-band.

14. The apparatus of claim 13, wherein, in determining the MCC, the processor is capable of:
    generating a RSSI pattern according to the measured RSSIs;
    comparing the RSSI pattern with a plurality of pre-stored RSSI waveforms corresponding to a plurality of MCCs; and
    determining the MCC according to a comparison result.

15. The apparatus of claim 13, wherein, in determining the MCC, the processor is capable of:
    generating a RSSI pattern according to the measured RSSIs;
    inputting the RSSI pattern to an MCC classifier; and
    determining the MCC according to a plurality of output probabilities,
    wherein the MCC classifier generates the plurality of output probabilities corresponding to a plurality of MCCs.

16. The apparatus of claim 15, wherein the MCC classifier generates the plurality of output probabilities according to a deep learning mechanism, a machine learning mechanism, a neural network mechanism or an artificial intelligence mechanism.

17. The apparatus of claim 11, wherein, in determining the frequency band search order, the processor selects a plurality of frequency bands supported by the MCC.

18. The apparatus of claim 11, wherein, in determining the frequency band search order, the processor selects a plurality of frequency bands according to a pre-stored band table corresponding to the MCC.

19. The apparatus of claim 11, wherein the processor is further capable of:
   skipping search of a frequency band not supported by the determined MCC.

20. The apparatus of claim 11, wherein the processor is further capable of:
   performing a full-band search in an event that no suitable cell is searched according to the frequency band search order.

\* \* \* \* \*